US011314851B2

(12) United States Patent
Yu et al.

(10) Patent No.: US 11,314,851 B2
(45) Date of Patent: *Apr. 26, 2022

(54) METHOD FOR PROTECTING PRIVATE INFORMATION AND TERMINAL DEVICE

(71) Applicant: Huawei Technologies Co., Ltd., Shenzhen (CN)

(72) Inventors: Xiaobo Yu, Shenzhen (CN); Shuiping Long, Beijing (CN); Shunan Fan, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/904,020

(22) Filed: Jun. 17, 2020

(65) Prior Publication Data

US 2020/0320183 A1 Oct. 8, 2020

Related U.S. Application Data

(63) Continuation of application No. 15/766,975, filed as application No. PCT/CN2015/091475 on Oct. 8, 2015, now Pat. No. 10,715,997.

(51) Int. Cl.
*G06F 21/32* (2013.01)
*G06F 3/0484* (2013.01)
(Continued)

(52) U.S. Cl.
CPC ............ *G06F 21/32* (2013.01); *G06F 3/0484* (2013.01); *G06F 21/00* (2013.01); *G06F 21/31* (2013.01);
(Continued)

(58) Field of Classification Search
CPC ........ G06F 21/32; G06F 3/0484; G06F 21/00; G06F 21/31; G06F 21/316; G06F 21/36; H04M 1/725; H04W 12/02
See application file for complete search history.

(56) References Cited

U.S. PATENT DOCUMENTS 9,021,610 B2    4/2015  Hafeman
2007/0241861 A1*  10/2007  Venkatanna ............ G06F 21/40
                                                              340/5.52
(Continued)

FOREIGN PATENT DOCUMENTS

CN    103064585 A    4/2013
CN    103440446 A    12/2013
(Continued)

OTHER PUBLICATIONS

Google Scholar Search Results, retrieved from the internet: https://patents.google.com/?q=terminal+device&q=interface&q=preset&q=unlock+operation&q=receiving&before=priority:20151008&num50&patents, Oct. 8, 2015, 6 pages.

*Primary Examiner* — Qun Shen
(74) *Attorney, Agent, or Firm* — Conley Rose, P.C.

(57) ABSTRACT

A method for unlocking an electronic device includes unlocking a screen of the electronic device and displaying a first interface in response to receiving an image, wherein the image comprises an eyeprint image or an iris image that matches a preset condition, wherein the first interface comprises a previous interface that displayed before the screen was last locked, and unlocking the screen and displaying a second interface in response to receiving the image and in response to detecting an action of blinking or moving an eyeball, wherein the second interface is different than the first interface.

20 Claims, 10 Drawing Sheets

(51) Int. Cl.
*G06F 21/00* (2013.01)
*G06F 21/31* (2013.01)
*H04M 1/725* (2021.01)
*G06F 21/36* (2013.01)
*H04W 12/06* (2021.01)
*H04W 12/08* (2021.01)
*H04W 12/065* (2021.01)
*H04W 12/02* (2009.01)

(52) U.S. Cl.
CPC .......... *G06F 21/316* (2013.01); *G06F 21/36* (2013.01); *H04M 1/725* (2013.01); *H04W 12/02* (2013.01); *H04W 12/06* (2013.01); *H04W 12/065* (2021.01); *H04W 12/068* (2021.01); *H04W 12/08* (2013.01)

(56) References Cited

U.S. PATENT DOCUMENTS

| | | | | |
|---|---|---|---|---|
| 2009/0258667 | A1* | 10/2009 | Suzuki | G06F 21/32 455/550.1 |
| 2011/0300831 | A1* | 12/2011 | Chin | G06F 21/36 455/411 |
| 2014/0026210 | A1 | 1/2014 | Ching et al. | |
| 2014/0033298 | A1* | 1/2014 | Park | G06F 21/32 726/17 |
| 2014/0075368 | A1 | 3/2014 | Kim et al. | |
| 2014/0075526 | A1 | 3/2014 | Kim | |
| 2014/0111452 | A1 | 4/2014 | Park et al. | |
| 2014/0344954 | A1 | 11/2014 | Kim et al. | |
| 2015/0002461 | A1* | 1/2015 | Guarneri | G06F 3/0446 345/174 |
| 2015/0050916 | A1 | 2/2015 | Bandyopadhyay et al. | |
| 2015/0067791 | A1 | 3/2015 | Matus | |
| 2015/0178517 | A1 | 6/2015 | Stoev et al. | |
| 2015/0257004 | A1 | 9/2015 | Shanmugam et al. | |
| 2015/0326570 | A1* | 11/2015 | Publicover | G06K 9/00604 726/4 |
| 2016/0269399 | A1* | 9/2016 | Abreu | H04L 63/0861 |
| 2018/0302786 | A1 | 10/2018 | Yu et al. | |

FOREIGN PATENT DOCUMENTS

| | | |
|---|---|---|
| CN | 103778381 A | 5/2014 |
| CN | 103886232 A | 6/2014 |
| CN | 103973891 A | 8/2014 |
| CN | 104320536 A | 1/2015 |
| CN | 104487980 A | 4/2015 |
| CN | 104899494 A | 9/2015 |
| CN | 104978109 A | 10/2015 |
| CN | 106687969 A | 5/2017 |
| EP | 2690576 A2 | 1/2014 |
| EP | 2901247 B1 | 4/2018 |
| WO | 2017059570 A1 | 4/2017 |

\* cited by examiner

METHOD FOR PROTECTING PRIVATE INFORMATION AND TERMINAL DEVICE

CROSS-REFERENCE TO RELATED APPLICATIONS

This application is a continuation of U.S. patent application Ser. No. 15/766,975, filed on Apr. 9, 2018, which is a National Stage Application of International Patent Application No. PCT/CN2015/091475, filed on Oct. 8, 2015, which are incorporated by reference in their entireties.

TECHNICAL FIELD

The present disclosure relates to the field of mobile communications technologies, and in particular, to a method for protecting private information and a terminal device.

BACKGROUND

Currently, as intelligent terminal devices are popularized, users have increasing risks of leaking private information. Although there are many dedicated applications for private information protection in the prior art, for example, information or photos in a terminal device are encrypted, and a fingerprint, or a preset password or gesture needs to be input to view the information or the photos, there is still a problem that private information cannot be comprehensively protected in some easily overlooked scenarios.

SUMMARY

To resolve the foregoing technical problem, embodiments of the present disclosure provide a method for protecting private information and a terminal device, so as to better protect private information of a user.

In this specification, some embodiments provide the foregoing method and terminal device by using a disclosed device. The terminal device described in the embodiments of the present disclosure may also be referred to as a mobile phone, user equipment (UE), a system, a subscriber unit, a subscriber station, a mobile site, a mobile station, a remote station, a remote terminal device, a mobile device, a user terminal device, a mobile terminal device, a wireless communications device, a user agent, or a user apparatus. For example, the device may be a cellular phone, a cordless phone, a Session Initiation Protocol (SIP) phone, a wireless local loop (WLL) station, a personal digital assistant (PDA), a handheld device that has a wireless communication function, a computing device, an in-vehicle communication module, a smart meter, a smart home device, or another processing device connected to a wireless modem.

In some embodiments, the device has one or more processors, memories, and sensors, and one or more modules, programs, or instruction sets that are stored in the memory and that are configured to execute multiple functions. In some embodiments, these functions may include image editing, drawing, presentation, word processing, web page creation, disk editing, spreadsheet creation, playing games, making and answering phone calls, video conferencing, sending and receiving emails, instant message communication, exercise support, digital photography, digital video recording, web browsing, digital music playing, and/or digital video playing. Executable instructions used to execute these functions may be included in a non-transitory computer readable storage medium or another computer program product that is configured to be executed by the one or more processors.

The sensor described in the embodiments of the present disclosure refers to a detection apparatus that can sense information to be measured and convert, according to a specific law, the sensed information into an electrical signal or another required form. In some embodiments, the sensor may include but is not limited to a camera, a microphone, a light sensor, a touch sensor, a pressure sensor, a gravity sensor, a fingerprint sensor, a temperature sensor, or a humidity sensor. In some embodiments, the sensor further includes various buttons on the terminal device, such as a physical power button, a physical volume key, a physical function key, or a virtual lock screen key.

According to a first aspect, an embodiment of the present disclosure provides a method for protecting private information, including, when detecting an unlock operation, first displaying, by a terminal device, a first interface after unlocking, where the first interface is an interface last displayed before the terminal device locks a screen; and when detecting a special unlock operation, first displaying, by the terminal device, a second interface after unlocking, where the special unlock operation includes a combination of the unlock operation and an additional operation, and the second interface is different from the first interface. According to the method for protecting private information provided in this embodiment of the present disclosure, after detecting the special unlock operation, the terminal device can first display the second interface. This avoids a problem that the private information of a user is directly presented on the screen after unlocking, thereby more comprehensively protecting the private information of the user.

According to a first possible implementation of the first aspect, the additional operation includes an additional operation in a process of the unlock operation.

According to a second possible implementation of the first aspect, before displaying the second interface, the terminal device may first disable an application corresponding to the first interface, and then display the second interface. This may more completely avoid leakage of the private information.

According to a third possible implementation of the first aspect, it is assumed that in the first aspect, the terminal device first displays the first interface after unlocking when detecting the unlock operation for the first time, and the terminal device first displays the second interface after unlocking when detecting the special unlock operation for the first time. In this case, when detecting the special unlock operation or the unlock operation for the second time, the terminal device first displays, after unlocking, an interface last displayed before the screen is last locked before the special unlock operation is detected for the first time. In this way, after a risk of privacy leakage disappears, when the user needs to continuously perform an operation on an interface that is previously hidden and that includes the private information, the terminal device can quickly restore the interface.

According to a second aspect, an embodiment of the present disclosure provides a method for protecting private information, including, when detecting an unlock operation, first displaying, by a terminal device, a first interface after unlocking, where the first interface is an interface last displayed before the terminal device locks a screen; and when detecting a special unlock operation, first displaying, by the terminal device, a second interface after unlocking, where the special unlock operation includes the unlock operation in which a value of at least one operation dimension is greater than a preset threshold, and the second interface is different from the first interface. According to the method for protecting private information provided in this embodiment of the present disclosure, after detecting the special unlock operation, the terminal device can first display the second interface. This avoids a problem that the private information of a user is directly presented on the screen after unlocking, thereby more comprehensively protecting the private information of the user.

According to a third aspect, an embodiment of the present disclosure provides a method for protecting private information, including, when detecting a special lock screen operation, returning, by a terminal device, to a system interface or opening a preset interface, where the special lock screen operation includes consecutively or simultaneously pressing at least two preset buttons of the terminal device; entering, by the terminal device, a locked state; and when detecting an unlock operation, first displaying, by the terminal device, the system interface or the preset interface after unlocking. According to the method for protecting private information provided in this embodiment of the present disclosure, after detecting the special lock screen operation, the terminal device can first return to the system interface or first open the preset interface to hide an interface including the private information, and then lock a screen. Therefore, after detecting an unlock operation, the terminal device first displays the system interface or the preset interface. This avoids a problem that the private information of a user is directly presented on the screen after unlocking, thereby more comprehensively protecting the private information of the user.

According to a fourth aspect, an embodiment of the present disclosure provides a terminal device configured to protect private information, including a memory configured to store a preset unlock operation and a preset special unlock operation, where the special unlock operation includes a combination of the unlock operation and an additional operation; at least one sensor configured to detect the unlock operation and the special unlock operation; a processor configured to, when the at least one sensor detects the unlock operation, instruct the terminal device to first display a first interface after unlocking, where the first interface is an interface last displayed before the terminal device locks a screen, and when the at least one sensor detects the special unlock operation, instruct the terminal device to first display a second interface after unlocking, where the second interface is different from the first interface; and a screen configured to display the first interface or the second interface.

According to a first possible implementation of the fourth aspect, the additional operation includes an additional operation in a process of the unlock operation.

According to a second possible implementation of the fourth aspect, the processor is further configured to, before the screen of the terminal device displays the second interface, first disable an application corresponding to the first interface, and then display the second interface.

According to a third possible implementation of the fourth aspect, when that the at least one sensor detects the unlock operation means that the at least one sensor detects the unlock operation for the first time, and when that the at least one sensor detects the special unlock operation means that the at least one sensor detects the special unlock operation for the first time, the processor is further configured to, when the at least one sensor detects the special unlock operation or the unlock operation for the second time, instruct the terminal device to first display, after unlocking, an interface last displayed before the screen is last locked before the at least one sensor detects the special unlock operation for the first time.

According to a fifth aspect, an embodiment of the present disclosure provides a terminal device configured to protect private information, including a memory configured to store a preset unlock operation and a preset special unlock operation, where the special unlock operation includes the unlock operation in which a value of at least one operation dimension is greater than a preset threshold; at least one sensor configured to detect the unlock operation and the special unlock operation; a processor configured to, when the at least one sensor detects the unlock operation, instruct the terminal device to first display a first interface after unlocking, where the first interface is an interface last displayed before the terminal device locks a screen, and when the at least one sensor detects the special unlock operation, instruct the terminal device to first display a second interface after unlocking, where the second interface is different from the first interface; and a screen configured to display the first interface or the second interface.

According to a sixth aspect, an embodiment of the present disclosure provides a terminal device configured to protect private information, including a memory configured to store a preset special lock screen operation and a preset unlock operation, where the special unlock operation includes consecutively or simultaneously pressing at least two preset buttons of the terminal device; at least one sensor configured to detect the special lock screen operation and the unlock operation; a processor configured to, when the at least one sensor detects the special lock screen operation, instruct a screen of the terminal device to return to a system interface or open a preset interface, and instruct the terminal device to enter a locked state, and when the at least one sensor detects the unlock operation, instruct the screen of the terminal device to first display the system interface or the preset interface after unlocking; and a screen configured to display the system interface or the preset interface.

According to a seventh aspect, an embodiment of the present disclosure provides a terminal device configured to protect private information, including a first detection unit configured to detect an unlock operation; a first processing unit configured to, when the unlock operation is detected, instruct the terminal device to first display a first interface after unlocking, where the first interface is an interface last displayed before the terminal device locks a screen; a second detection unit configured to detect a special unlock operation, where the special unlock operation includes a combination of the unlock operation and an additional operation; a second processing unit configured to, when the special unlock operation is detected, instruct the terminal device to first display a second interface after unlocking, where the second interface is different from the first interface; and a display unit configured to display the first interface or the second interface.

According to a first possible implementation of the seventh aspect, the additional operation includes an additional operation in a process of the unlock operation.

According to a second possible implementation of the seventh aspect, the terminal device further includes a third processing unit configured to, before the terminal device displays the second interface, disable an application corresponding to the first interface, and then display the second interface.

According to a third possible implementation of the seventh aspect, when that the unlock operation is detected means that the unlock operation is detected for the first time, and when that the special unlock operation is detected means that the special unlock operation is detected for the first time, the terminal device further includes a fourth processing unit configured to, when the special unlock operation or the unlock operation is detected for the second time, instruct the terminal device to first display, after unlocking, an interface last displayed before the screen is last locked before the special unlock operation is detected for the first time.

According to an eighth aspect, an embodiment of the present disclosure provides a terminal device configured to protect private information, including a first detection unit configured to detect an unlock operation; a first processing unit configured to, when the unlock operation is detected, instruct the terminal device to first display a first interface after unlocking, where the first interface is an interface last displayed before the terminal device locks a screen; a second detection unit configured to detect a special unlock operation, where the special unlock operation includes the unlock operation in which a value of at least one operation dimension is greater than a preset threshold; a second processing unit configured to, when the special unlock operation is detected, instruct the terminal device to first display a second interface after unlocking, where the second interface is different from the first interface; and a display unit configured to display the first interface or the second interface.

According to an eighth aspect, an embodiment of the present disclosure provides a terminal device configured to protect private information, including a first detection unit configured to detect a special lock screen operation, where the special unlock operation includes consecutively or simultaneously pressing at least two preset buttons of the terminal device; a first processing unit configured to, when the special lock screen operation is detected, instruct the terminal device to return to a system interface or open a preset interface, and instruct the terminal device to enter a locked state; a second detection unit configured to detect an unlock operation; a second processing unit configured to, when the unlock operation is detected, instruct the terminal device to first display the system interface or the preset interface after unlocking; and a display unit configured to display the system interface or the preset interface.

Based on the foregoing technical solutions, when detecting a special unlock operation, a terminal device first displays a second interface after unlocking. This avoids a problem that private information of a user is directly presented on a screen after the unlocking, thereby more comprehensively protecting the private information of the user.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
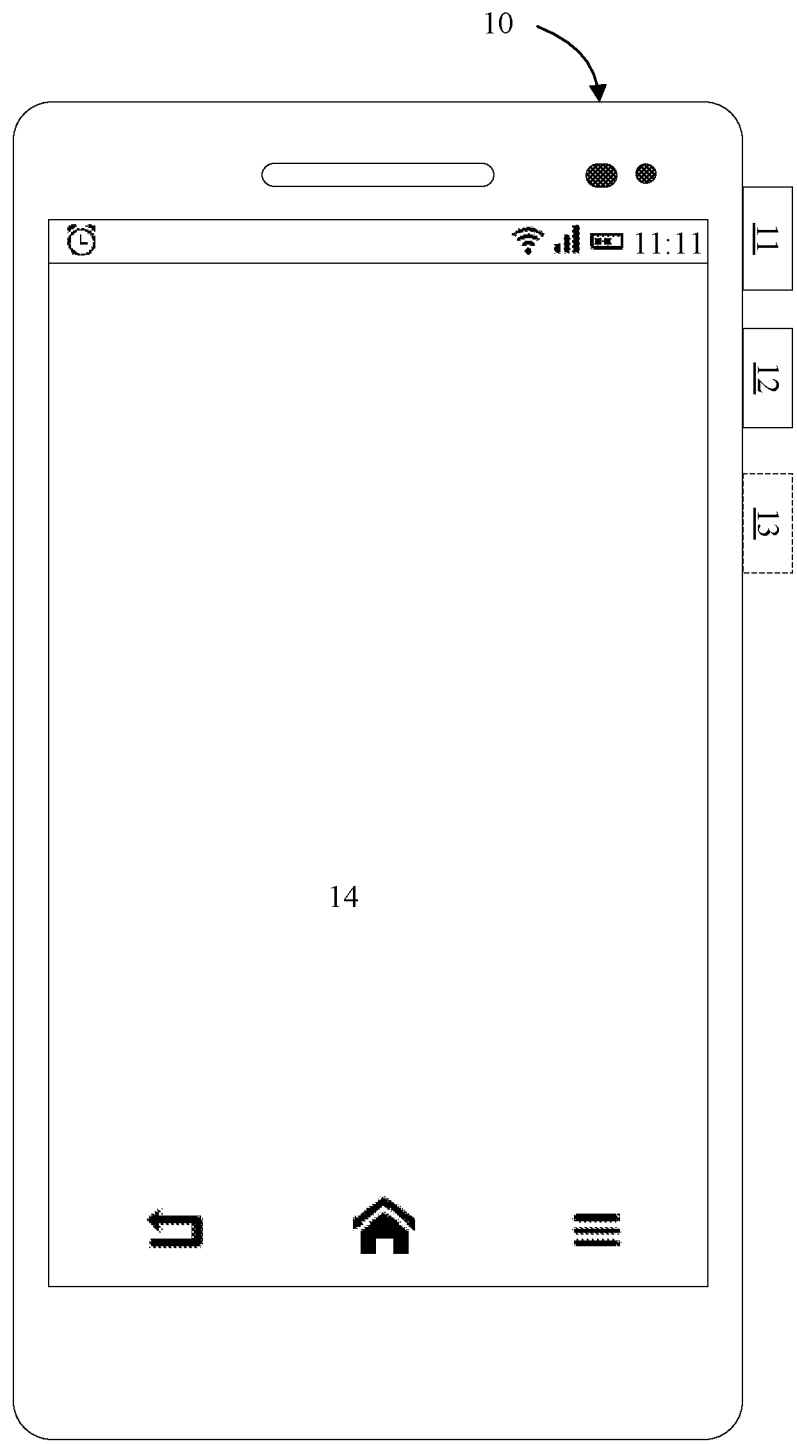
FIG. 1 is a schematic diagram of an appearance of a terminal device according to an embodiment of the present disclosure.

FIG. 1 is a schematic diagram of an appearance of a terminal device 10 according to an embodiment of the present disclosure. The terminal device 10 includes a physical power button 11, a physical volume key 12, and a touchscreen 14. Optionally, the terminal device 10 further includes a physical function key 13. A position of each physical button in FIG. 1 is merely an example, and the position of the physical button in an actual product may be arbitrarily changed. The terminal device provided with an Android operating system is used as an example in FIG. 1. The present disclosure may be further applied to a terminal device provided with another operating system, such as iOS and Windows.

In the prior art, after a user unlocks the terminal device, the terminal device directly displays a first interface. In this embodiment of the present disclosure, the first interface is an interface that is being displayed when the terminal device locks a screen. Alternatively, it may be understood that the first interface is an interface last displayed before the terminal device locks a screen. For example, the user is reading an ebook on the terminal device, the ebook includes an interface 1, an interface 2, . . . , and an interface n, and if the screen is locked when the user reads the interface 2, the interface 2 is the first interface in this embodiment of the present disclosure. If private information of the user is displayed on the first interface, there is a risk of leakage of the private information. For example, if the user performs a lock screen operation when the terminal device displays a chat interface of an instant communication application, the terminal device directly displays the chat interface after unlocking. In addition to the user, others may also see information on the chat interface. In some social scenarios, the user does not actually expect others to see the information on the chat interface. For example, in a scenario in which a husband is having a chat with an opposite sex friend, when his wife approaches, the husband performs the lock screen operation; and if his wife asks to look at the terminal device, the husband may be extremely reluctant to let his wife see the chat interface directly displayed by the terminal device after the unlocking, and husband's reluctance may also cause his wife's suspicion.

Embodiment 1 of the present disclosure provides a method for protecting private information, and a special unlock operation is formed by adding an additional operation based on an existing unlock operation. When detecting an unlock operation, a terminal device first displays a first interface after unlocking; and when detecting a special unlock operation, the terminal device first displays a second interface after unlocking, where the second interface is different from the first interface, that is, any other interface other than an interface last displayed before the terminal device locks a screen is the second interface. That "the first interface is first displayed after the unlocking" indicates that an interface that is displayed immediately or after a short delay after the terminal device is unlocked is the first interface, and that "the second interface is first displayed after the unlocking" indicates that an interface that is displayed immediately or after a short delay after the terminal device is unlocked is the second interface.

Figure 2:
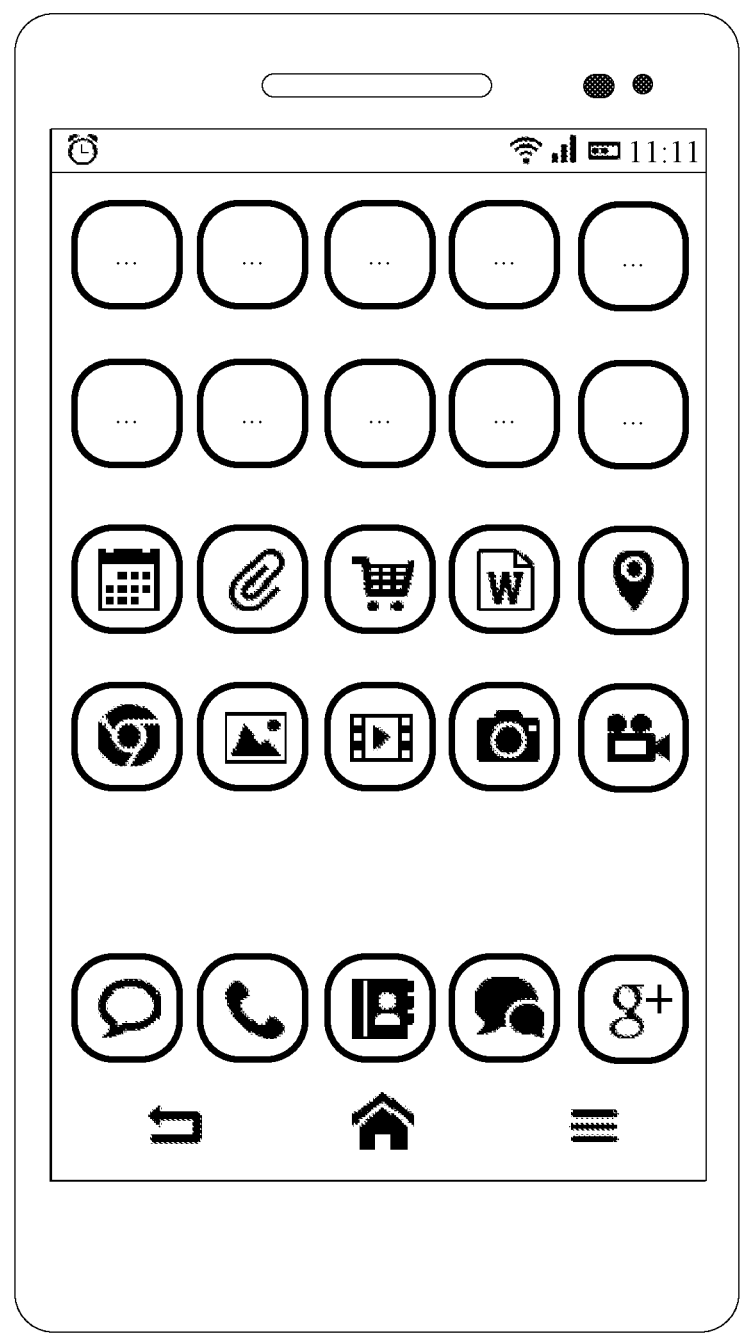
FIG. 2 is a diagram of an example of a system interface according to an embodiment of the present disclosure.

The second interface may include any one of the following such as a system interface, a preset hidden interface, or a preset application interface. The system interface may also be referred to as a desktop, an icon interface, a user interface (UI), or an operation interface. As shown in FIG. 2, an interface on which at least one interface element is arranged is the system interface described in this embodiment of the present disclosure. The interface element includes but is not limited to an application icon, a folder icon, or a widget icon. The preset hidden interface is an interface that is preset in the terminal device and that is used to completely or partially cover the first interface. For example, the preset hidden interface may be a picture. The preset application interface is a preset interface of a specific application. For example, when the first interface is a chat interface of an instant communication application, the preset application interface may be an initially opened interface or any interface of a weather application.

The foregoing unlock operation includes but is not limited to any one or any combination of the following such as slide unlocking, password unlocking, gesture unlocking, fingerprint unlocking, face unlocking, eyeprint unlocking, iris unlocking, speech unlocking, pressure unlocking, or the like.

In this embodiment of the present disclosure, the special unlock operation detected by the terminal device includes but is not limited to any one or any combination of the following unlock operation or additional operation.

Figure 3:
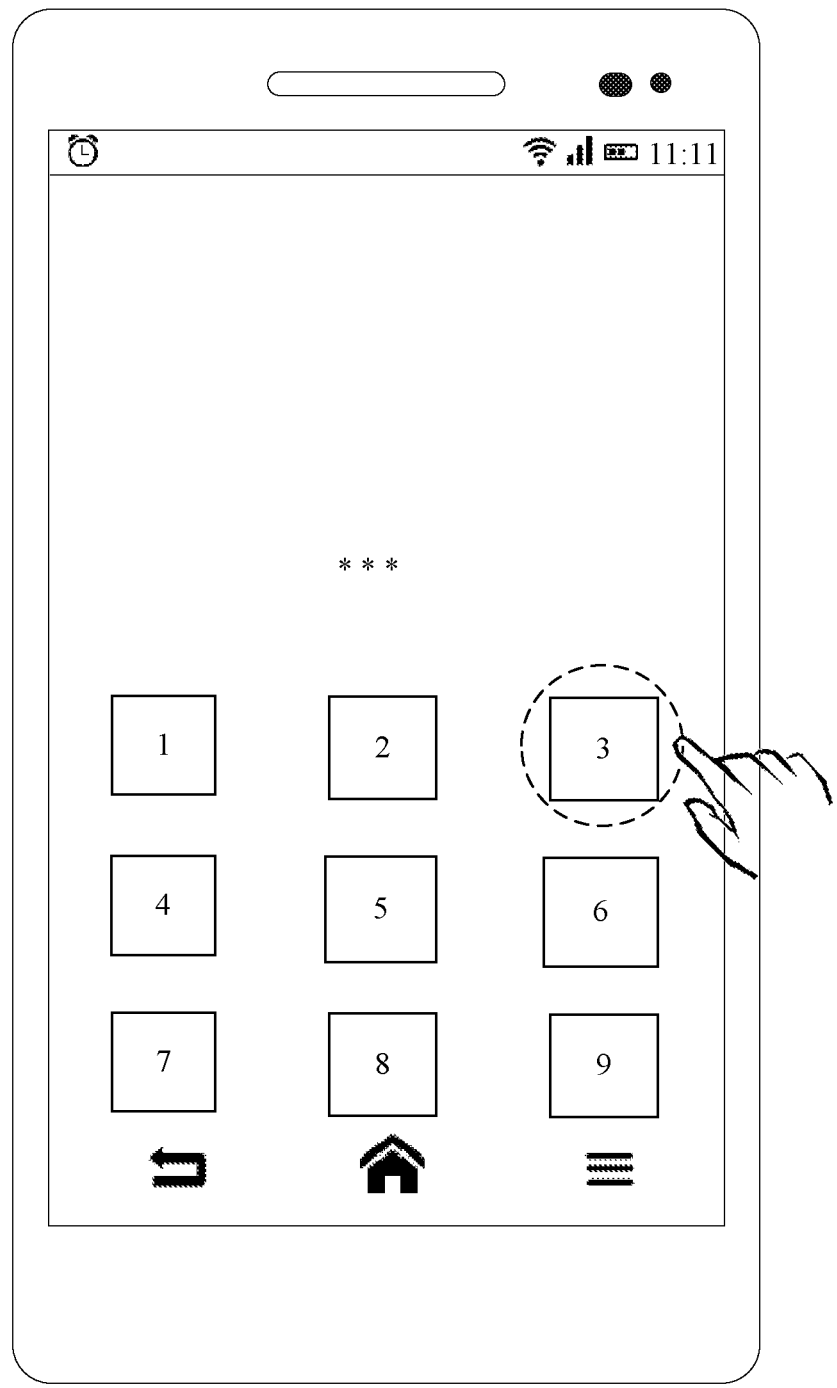
FIG. 3 is a diagram of an example of a special unlock operation according to an embodiment of the present disclosure.

1. FIG. 3 is a diagram of an example of a special unlock operation according to an embodiment of the present disclosure. The unlock operation is the password unlocking, that is, to input a preset password. The additional operation includes any one or any combination of the following such as touching and holding at least one password key for a time period exceeding preset duration, pressing any password key with a strength exceeding a preset strength, or drawing a circle around at least one password key. For example, the unlock operation is to input a password "1234", and the additional operation is to touch and hold "3" on a keyboard for a time period exceeding preset duration when a password key "3" is being input. Alternatively, as shown in FIG. 3, a circle is drawn around "3" on the keyboard. This embodiment of the present disclosure imposes no limitation on the preset duration or the preset strength; for example, the preset duration may be one second, and the preset strength may be 1500 Pascals.

Figure 4:
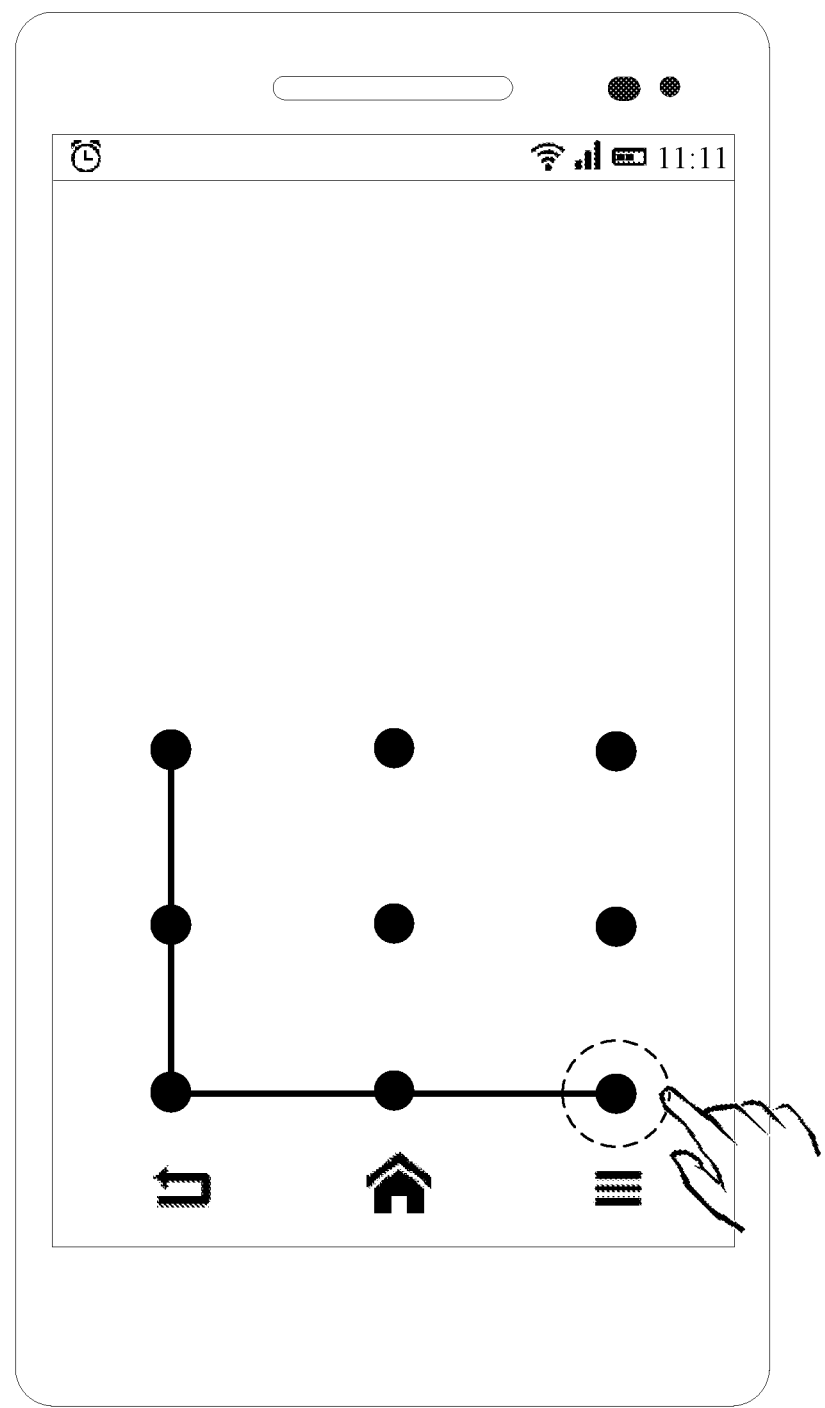
FIG. 4 is a diagram of an example of another special unlock operation according to an embodiment of the present disclosure.

2. FIG. 4 is a diagram of an example of another special unlock operation according to an embodiment of the present disclosure. The unlock operation is the gesture unlocking, that is, to input a preset gesture. The additional operation includes any one or any combination of the following such as touching and holding at least one gesture node for a time period exceeding preset duration, pressing any gesture node with a strength exceeding a preset strength, or drawing a circle around at least one gesture node. The gesture node is a node of a gesture pattern, for example, when a last node is being drawn, the additional operation is to touch and hold the last node for a time period exceeding third preset duration. Alternatively, as shown in FIG. 4, a circle is drawn around the last node. This embodiment of the present disclosure imposes no limitation on the preset duration or the preset strength; for example, the preset duration may be one second, and the preset strength may be 1500 Pascals.

Figure 5:
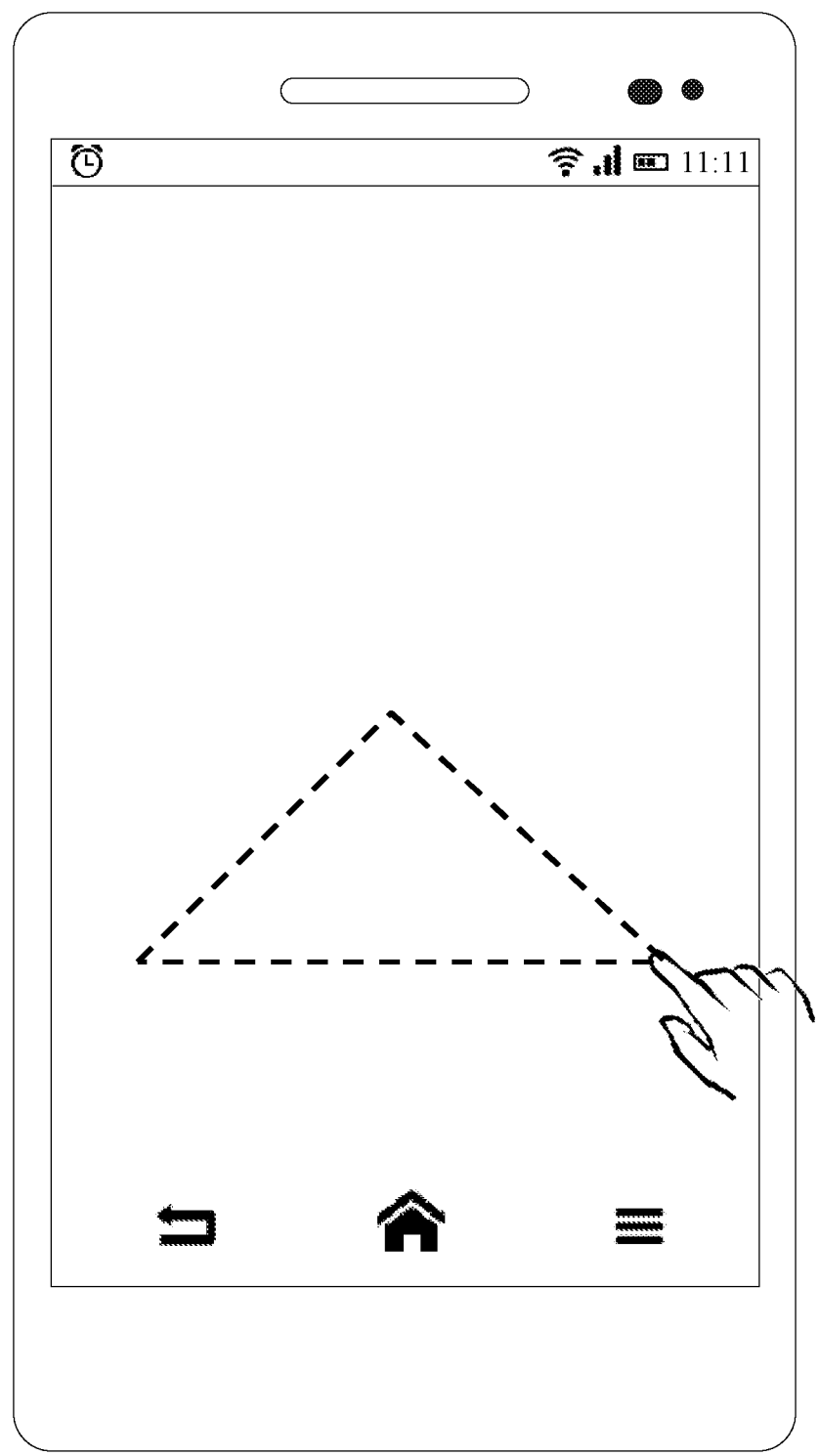
FIG. 5 is a diagram of an example of another special unlock operation according to an embodiment of the present disclosure.
Figure 6:
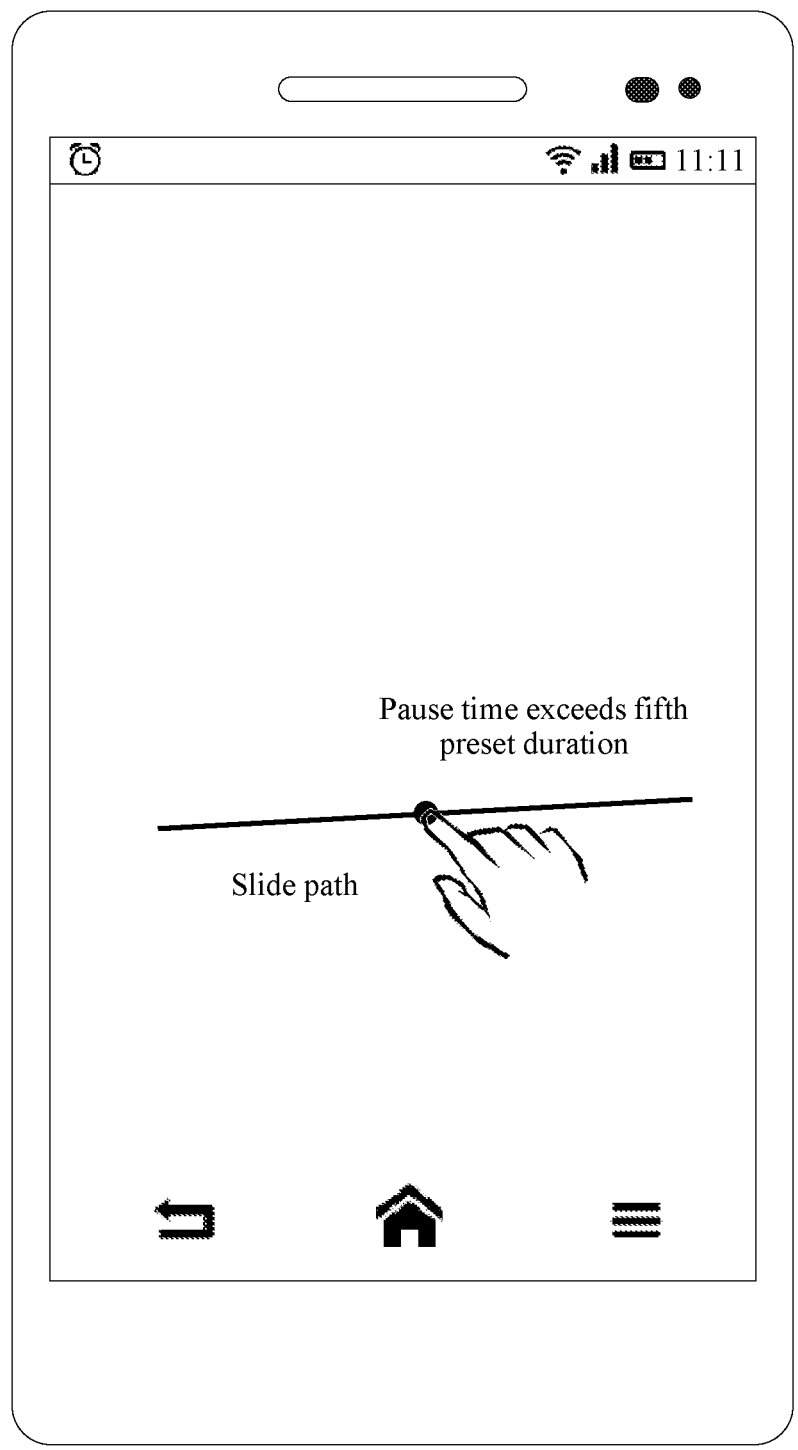
FIG. 6 is a diagram of an example of another special unlock operation according to an embodiment of the present disclosure.

3. FIG. 5 and FIG. 6 are diagrams of examples of other special unlock operations according to an embodiment of the present disclosure. The unlock operation is the slide unlocking, that is, to slide on a screen. The additional operation includes any one or any combination of the following such as drawing a preset pattern on the screen of the terminal device, staying at a specific point on a slide path for a time period exceeding preset duration, or pressing a specific point on a slide path with a strength exceeding a preset strength. As shown in FIG. 5, the additional operation is to draw a triangle in a process of sliding on the screen, or may be to draw a triangle after a process of sliding to an end point of the slide path, where the triangle is preset in the terminal device. Alternatively, as shown in FIG. 6, the additional operation is to stay at the specific point on the slide path for the time period exceeding the preset duration. This embodiment of the present disclosure imposes no limitation on the preset duration or the preset strength; for example, the preset duration may be one second, and the preset strength may be 1500 Pascals.

4. The unlock operation is the facial recognition unlocking, that is, to input a face image. The facial recognition unlocking includes the following steps. First, the face image is shot by using a camera of the terminal device; second, a facial recognition unlocking system analyzes the image, so as to obtain face feature information, and generate an unlocking information packet of the terminal device and store the unlocking information packet in a memory of the terminal device; third, a user' face is shot by using the camera during unlocking, and the facial recognition unlocking system analyzes a photo, so as to obtain face feature information; and finally, the facial recognition unlocking system compares the obtained face feature information with the face feature information in the unlocking information packet, and if the obtained face feature information is consistent with the face feature information in the unlocking information packet, the terminal device exits a locked state, or if the obtained face feature information is inconsistent with the face feature information in the unlocking information packet, the terminal device remains in a locked state.

In this embodiment of the present disclosure, in addition to the face feature information required for a normal unlock operation, the terminal device further stores preset face feature information including a specific action (for example, curling lips, frowning, or touching a chin), and the additional operation is to input the specific action in a process of inputting the face image. It should be noted that a difference between the face image that includes the specific information and that is input and the preset face feature information needs to be within a preset difference threshold, and if the difference exceeds the preset difference threshold, facial recognition may fail.

5. The unlock operation is the eyeprint unlocking or the iris unlocking, that is, to input an eyeprint or iris image. The eyeprint unlocking and the iris unlocking are similar to the facial recognition unlocking. In the eyeprint unlocking and the iris unlocking, eyeprint feature information or iris feature information of a user is first stored in a memory of the terminal device, and then the input eyeprint or iris image is compared with the stored eyeprint feature information or iris feature information during unlocking. If the input eyeprint or iris image is consistent with the stored eyeprint feature information or iris feature information, the terminal device exits a locked state; or if the input eyeprint or iris image is inconsistent with the stored eyeprint feature information or iris feature information, the terminal device remains in a locked state.

In this embodiment of the present disclosure, in addition to the eyeprint feature information or the iris feature information required for a normal unlock operation, the terminal device further stores preset eyeprint feature information or iris feature information that includes a specific action (for example, blinking at least once or moving eyeballs), and the additional operation is to blink at least once or move the eyeballs in a process of the eyeprint unlocking or the iris unlocking. When a sensor of the terminal device detects an action of blinking at least once or moving the eyeballs in a process of inputting the eyeprint image or the iris image, the special unlock operation is detected.

6. The unlock operation includes any one of the following such as the fingerprint unlocking, the facial recognition unlocking, the eyeprint unlocking, the iris unlocking, or the speech unlocking; and the additional operation is the following. A user touches and holds, in processes of these unlock operations, any physical button of the terminal device or a specific screen position of the terminal device for a time period exceeding preset duration, or presses, in processes of these unlock operations, a specific screen position of the terminal device with a strength exceeding a preset strength, for example, the user inputs a fingerprint and, at the same time, touches and holds "5" on a numeric keyboard for a time period exceeding preset duration, or presses "5" on a numeric keyboard with a strength exceeding a preset strength. The physical button of the terminal device includes a physical power button, a physical volume key, or a physical function key. The specific screen position of the terminal device includes a position of a virtual key displayed on a screen and any other position other than the position of the virtual key. This embodiment of the present disclosure imposes no limitation on the preset duration or the preset strength; for example, the preset duration may be one second, and the preset strength may be 1500 Pascals.

7. The unlock operation is any other unlock manner other than inputting a preset speech, and the additional operation is to input the preset speech in a process of the unlock operation. The preset speech is a preset word or sentence stored in the terminal device, for example, "hello". That the unlock operation is to input a preset password is used as an example. In a process of inputting the password, if a microphone or a speech sensor of the terminal device detects input of a speech "hello", the special unlock operation is detected.

The "touching and holding for a time period exceeding preset duration" described in this embodiment of the present disclosure may also be understood as a long press. A difference between the long press and a normal touch is the following. A time period in which a finger is consecutively in contact with a surface of the terminal device is longer, and the preset duration may be arbitrarily set and is generally greater than duration in which the finger is consecutively in contact with the surface of the terminal device during a normal touch operation. The "pressing with a strength exceeding a preset strength" described in this embodiment of the present disclosure may also be understood as a press. A difference between the press and the normal touch is the following. A strength generated when the finger is in contact with the surface of the terminal device is greater, and the preset strength may be arbitrarily set and is generally greater than a strength generated when the finger is in contact with the surface of the terminal device during the normal touch operation.

In this embodiment of the present disclosure, all special unlock operation manners may be pre-stored in the terminal device. After a user activates a function of a special unlock operation in the terminal device, the terminal device may detect the special unlock operation, so as to protect private information.

Optionally, the additional operation is an additional operation in the process of the unlock operation, that is, the additional operation is performed in the process of performing the unlock operation. If the terminal device detects the additional operation after detecting that the unlock operation starts, when the unlock operation ends, the special unlock operation is detected.

Optionally, after detecting the special unlock operation, the terminal device disables an application corresponding to the first interface. For example, the application corresponding to the first interface may be first disabled, and then the second interface is displayed. This may more completely avoid leakage of the private information.

Optionally, when detecting the unlock operation for the first time, the terminal device first displays the first interface after unlocking. When detecting the special unlock operation for the first time, the terminal device first displays the second interface after unlocking. When detecting the special unlock operation or the unlock operation for the second time, the terminal device first displays a third interface after unlocking, where the third interface is an interface last displayed before the screen is last locked before the terminal device first detects the special unlock operation for the first time. The third interface is an interface in the first interface. After inputting the special unlock operation for the first time to hide or close the third interface, a user may input the special unlock operation or the normal unlock operation for the second time to restore the third interface. In this way, after a risk of privacy leakage disappears, when the user needs to continuously perform an operation on the third interface, the terminal device can quickly restore the third interface.

Figure 7:
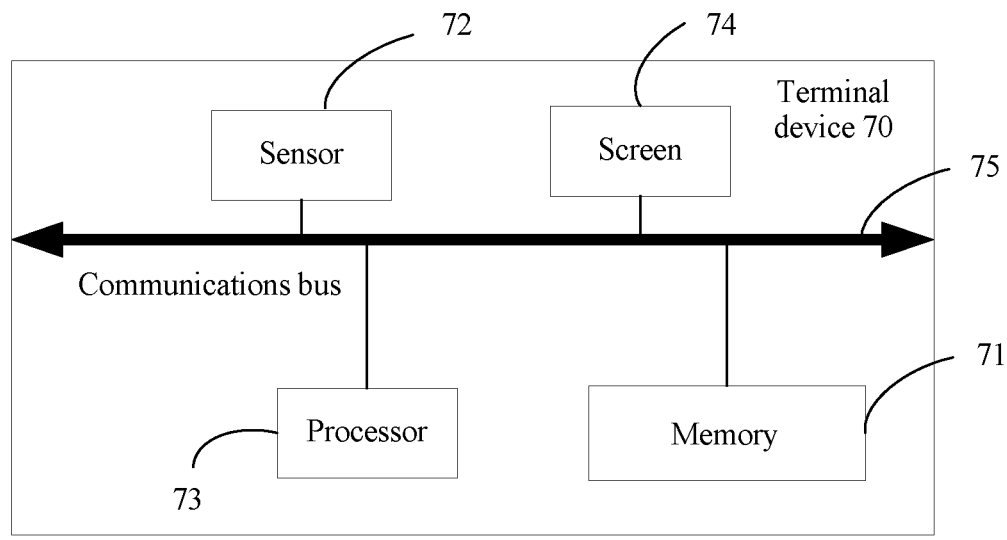
FIG. 7 is a schematic structural diagram of a terminal device configured to protect private information according to an embodiment of the present disclosure.

FIG. 7 shows a terminal device 70 configured to protect private information according to an embodiment of the present disclosure, including a memory 71 configured to store a preset unlock operation and a preset special unlock operation, where the special unlock operation includes a combination of the unlock operation and an additional operation; at least one sensor 72 configured to detect the unlock operation and the special unlock operation; a processor 73 configured to, when the at least one sensor detects the unlock operation, instruct the terminal device to first display a first interface after unlocking, where the first interface is an interface last displayed before the terminal device locks a screen, and when the at least one sensor detects the special unlock operation, instruct the terminal device to first display a second interface after unlocking, where the second interface is different from the first interface; and a screen 74 configured to display the first interface or the second interface.

Optionally, the terminal device 70 further includes a communications bus 75, and the memory 71, the sensor 72, the processor 73, and the screen 74 are connected by using the communications bus 75.

Optionally, the processor 73 is further configured to, before the screen 74 displays the second interface, disable an application corresponding to the first interface.

Optionally, when the at least one sensor 72 detects the unlock operation for the first time, the terminal device first displays the first interface after unlocking; and when the at least one sensor 72 detects the special unlock operation for the first time, the terminal device first displays the second interface after unlocking. The processor 73 is further configured to, when the at least one sensor 72 detects the special unlock operation or the unlock operation for the second time, instruct the terminal device to first display, after unlocking, an interface last displayed before the screen is last locked before the at least one sensor 72 detects the special unlock operation for the first time.

The terminal device 70 may perform the method for protecting private information in Embodiment 1 and all extension solutions and alternatives thereof. For meanings of all terms in the technical solution of the terminal device 70, refer to the foregoing description. Details are not described herein.

Figure 8:
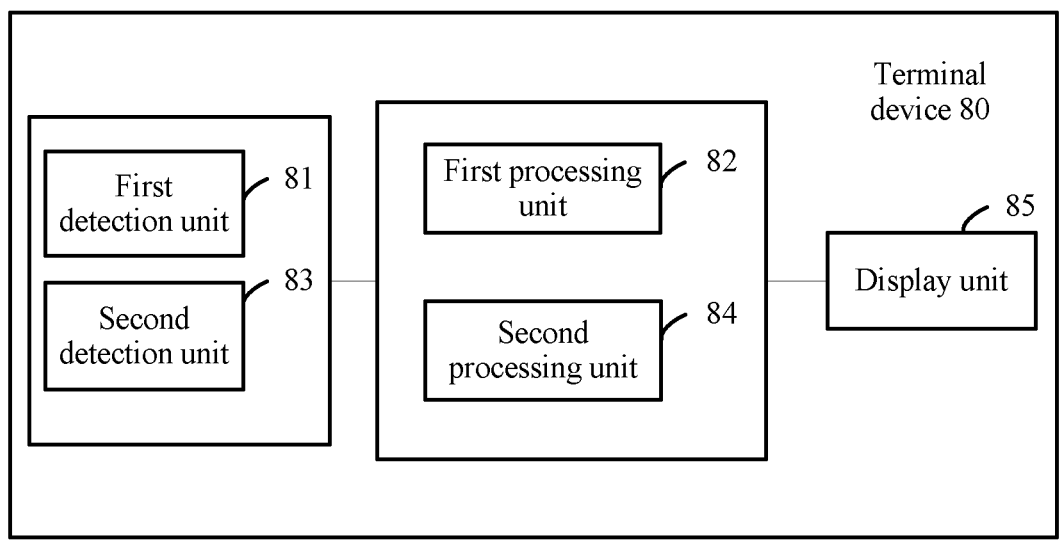
FIG. 8 is a schematic structural diagram of another terminal device configured to protect private information according to an embodiment of the present disclosure.

FIG. 8 shows a terminal device 80 configured to protect private information according to an embodiment of the present disclosure, including a first detection unit 81 configured to detect an unlock operation; a first processing unit 82 configured to, when the unlock operation is detected, instruct the terminal device to first display a first interface after unlocking, where the first interface is an interface last displayed before the terminal device locks a screen; a second detection unit 83 configured to detect a special unlock operation, where the special unlock operation includes a combination of the unlock operation and an additional operation; a second processing unit 84 configured to, when the special unlock operation is detected, instruct the terminal device to first display a second interface after unlocking, where the second interface is different from the first interface; and a display unit 85 configured to display the first interface or the second interface.

Optionally, the terminal device 80 further includes a third processing unit (not shown in FIG. 8) configured to, before the terminal device displays the second interface, disable an application corresponding to the first interface.

Optionally, when the first detection unit 81 detects the unlock operation for the first time, the terminal device first displays the first interface after unlocking; and when the second detection unit 83 detects the special unlock operation for the first time, the terminal device first displays the second interface after unlocking. The terminal device 80 further includes a fourth processing unit (not shown in FIG. 8) configured to, when the special unlock operation or the unlock operation is detected for the second time, instruct the terminal device to first display, after unlocking, an interface last displayed before the screen is last locked before the special unlock operation is detected for the first time.

The terminal device 80 may perform the method for protecting private information in Embodiment 1 and all extension solutions and alternatives thereof. For meanings of all terms in the technical solution of the terminal device 80, refer to the foregoing description. Details are not described herein.

In this embodiment of the present disclosure, when detecting a special unlock operation, a terminal device first displays a second interface after unlocking. This avoids a problem that private information of a user is directly presented on a screen after the unlocking, thereby more comprehensively protecting the private information of the user.

Figure 9A:
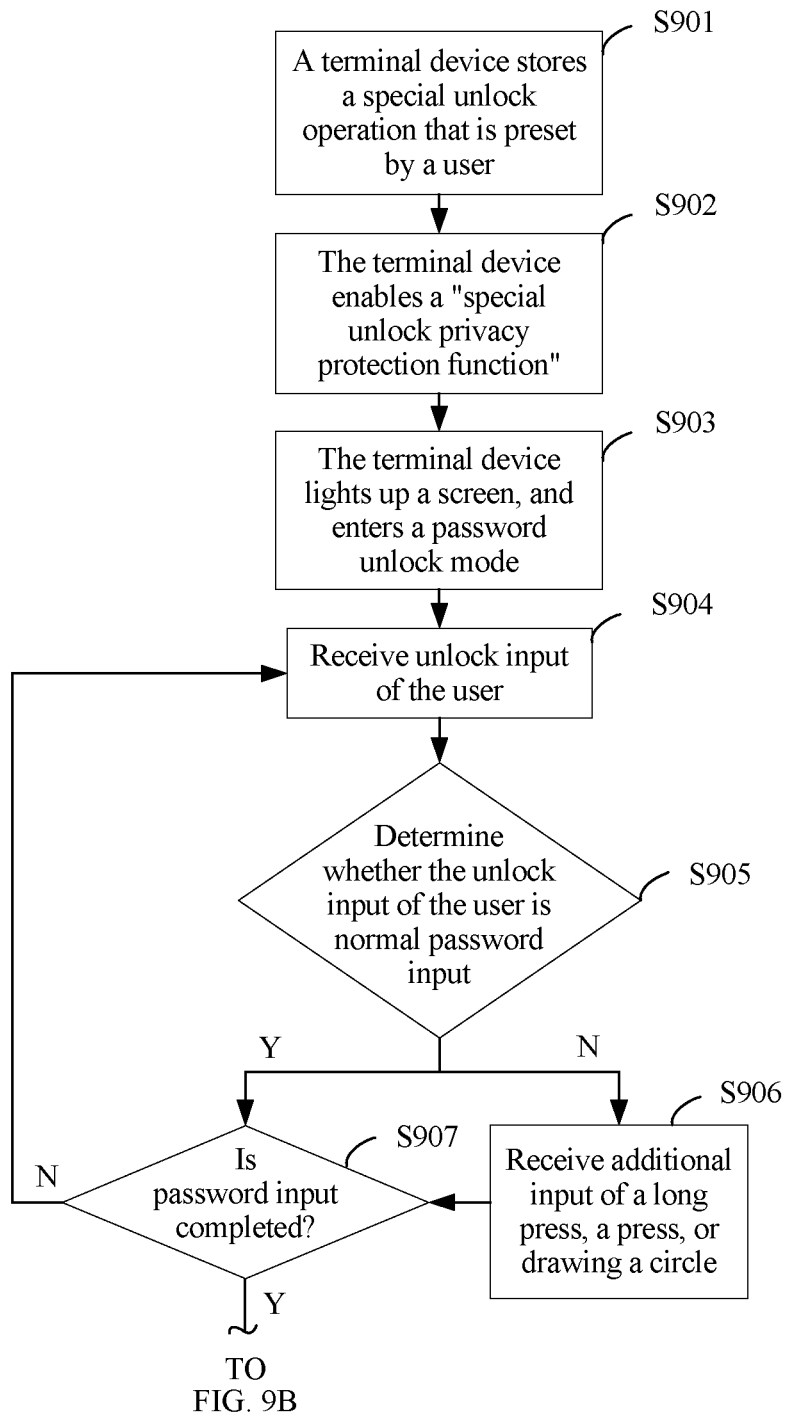
FIG. 9A and FIG. 9B are a flowchart of a method for protecting private information according to an embodiment of the present disclosure.
Figure 9B:
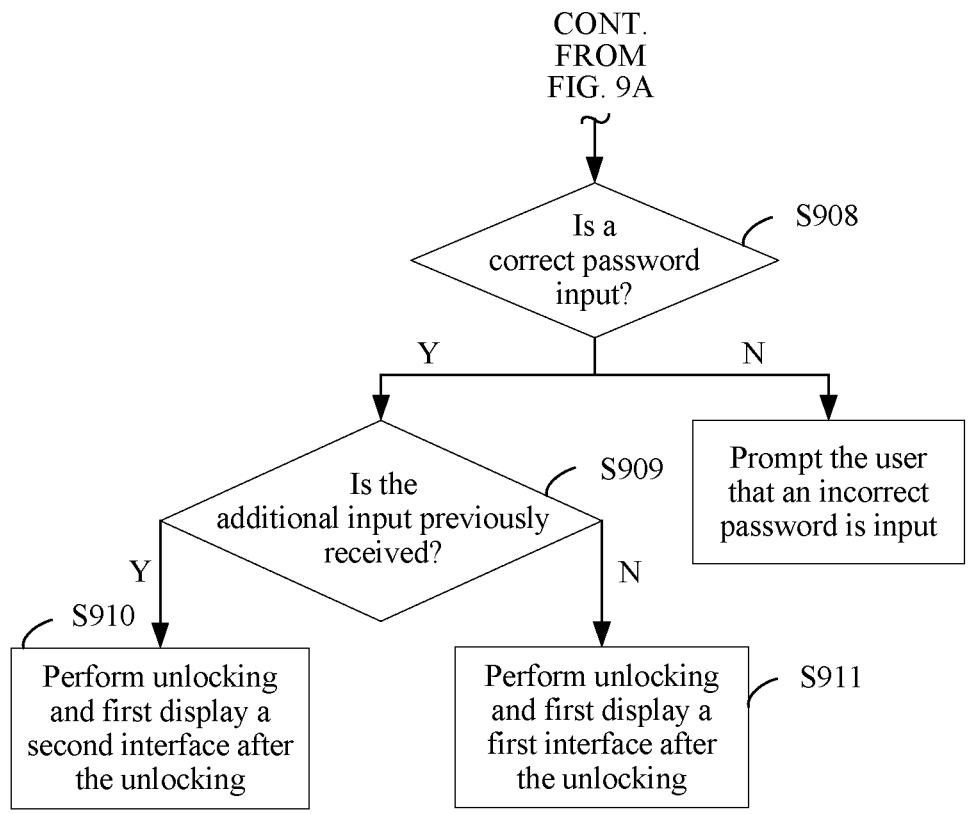

FIG. 9A and FIG. 9B are a flowchart of a specific implementation of protecting private information according to Embodiment 2 of the present disclosure. As shown in FIG. 9A and FIG. 9B, that an unlock manner is to input a preset password is used as an example in this embodiment, and the specific implementation includes the following.

S901. A terminal device stores a special unlock operation that is preset by a user. For example, in Embodiment 1, when the unlock operation is to input the preset password, the additional operation includes but is not limited to the following. Touching and holding at least one password key for a time period exceeding preset duration, pressing any password key with a strength exceeding a preset strength, or drawing a circle around at least one password key. The special unlock operation includes a combination of the unlock operation and the additional operation.

S902. Optionally, the user enables a "special unlock privacy protection function" in settings of the terminal device.

S903. The terminal device lights up a screen, and enters a password unlock mode.

S904. The terminal device receives unlock input of the user.

S905. The terminal device determines whether the unlock input of the user is normal password input; and if the unlock input of the user is the normal password input, perform S907, or if the unlock input of the user is not the normal password input, perform S906.

S906. The terminal device receives additional input of "touching and holding at least one password key for a time period exceeding preset duration", "pressing any password key with a strength exceeding a preset strength", or "drawing a circle around at least one password key".

S907. The terminal device determines whether the password input is completed; and if the password input is completed, perform S908, or if the password input is not completed, perform S904.

S908. The terminal device determines whether a correct password is input; and if the correct password is input, perform S909, or if the correct password is not input, prompt the user that an incorrect password is input.

S909. The terminal device determines whether the additional input of "touching and holding at least one password key for a time period exceeding preset duration", "pressing any password key with a strength exceeding a preset strength", or "drawing a circle around at least one password key" is previously received; and if the additional input is previously received, perform S910, or if the additional input is not previously received, perform S911.

S910. The terminal device performs unlocking and first displays a second interface after the unlocking.

S911. The terminal device performs unlocking and first displays a first interface after the unlocking.

In this embodiment of the present disclosure, when detecting a special unlock operation, a terminal device first displays a second interface after unlocking. This avoids a problem that private information of a user is directly presented on a screen after the unlocking, thereby more comprehensively protecting the private information of the user.

Embodiment 3 of the present disclosure provides another method for protecting privacy, including, when detecting an unlock operation, first displaying, by a terminal device, a first interface after unlocking; and when detecting a special unlock operation, first displaying, by the terminal device, a second interface after unlocking, where the special unlock operation includes the unlock operation in which a value of at least one operation dimension is greater than a preset threshold, and the second interface is different from the first interface.

A difference between Embodiment 3 and Embodiment 1 is the following. The special unlock operation in Embodiment 3 is not a combination of the unlock operation and an additional operation, but is a special unlock operation that is formed after the value of the at least one operation dimension is greater than the preset threshold and that is in the normal unlock operation. The unlock operation includes inputting a preset password, inputting a preset gesture, inputting a preset speech, or sliding on a screen. The operation dimension is an operation time, the value of the operation dimension is a length of the operation time, and the preset threshold is preset duration. For example, when the unlock operation is password unlocking, the special unlock operation is to input a password for a time period greater than preset duration, when the unlock operation is gesture unlocking, the special unlock operation is to input a gesture for a time period greater than preset duration, when the unlock operation is slide unlocking, the special unlock operation is to slide for a time period greater than preset duration, or when the unlock operation is speech unlocking, the special unlock operation is to input a preset speech for a time period greater than preset duration. This embodiment of the present disclosure imposes no limitation on the preset duration. Generally, the preset duration is greater than duration required for the normal unlock operation, for example, the preset duration may be 5 seconds. That is, when the terminal device detects that duration used in a current unlock operation is greater than the duration required for the normal unlock operation, the special unlock operation is detected.

Optionally, the unlock operation includes pressing a specific screen position of the terminal device. During the unlock operation, a strength used to press the specific screen position of the terminal device exceeds a first preset strength, the operation dimension is pressure, the value of the operation dimension is a strength of the pressure, and the preset threshold is a second preset strength, where the second preset strength is greater than the first preset strength. That is, the terminal device displays the second interface after unlocking only when detecting a strength greater than a strength used for normally unlocking the screen. This embodiment of the present disclosure imposes no limitation on the second preset strength. Generally, the second preset strength is greater than the first preset strength, that is, a strength required for normal pressure unlocking; for example, the second preset strength may be 1500 Pascals.

An embodiment of the present disclosure further provides a terminal device configured to protect private information. A structure of the terminal device is the same as that of the terminal device shown in FIG. 7. The terminal device includes a memory configured to store a preset unlock operation and a preset special unlock operation, where the special unlock operation includes the unlock operation in which a value of at least one operation dimension is greater than a preset threshold; at least one sensor configured to detect the unlock operation and the special unlock operation; a processor configured to, when the at least one sensor detects the unlock operation, instruct the terminal device to first display a first interface after unlocking, where the first interface is an interface last displayed before the terminal device locks a screen, and when the at least one sensor detects the special unlock operation, instruct the terminal device to first display a second interface after unlocking, where the second interface is different from the first interface; and a screen configured to display the first interface or the second interface.

An embodiment of the present disclosure further provides a terminal device configured to protect private information. A structure of the terminal device is the same as that of the terminal device shown in FIG. 8. The terminal device includes a first detection unit configured to detect an unlock operation; a first processing unit configured to, when the unlock operation is detected, instruct the terminal device to first display a first interface after unlocking, where the first interface is an interface last displayed before the terminal device locks a screen; a second detection unit configured to detect a special unlock operation, where the special unlock operation includes the unlock operation in which a value of at least one operation dimension is greater than a preset threshold; a second processing unit configured to, when the special unlock operation is detected, instruct the terminal device to first display a second interface after unlocking, where the second interface is different from the first interface; and a display unit configured to display the first interface or the second interface.

The foregoing two terminal devices may perform the method for protecting private information in Embodiment 3 and all extension solutions and alternatives thereof. The technical solution described in Embodiment 3 differs from the technical solution of Embodiment 1 in the special unlock operation. For other content, refer to description in Embodiment 1. Details are not described herein.

In this embodiment of the present disclosure, when detecting a special unlock operation, a terminal device first displays a second interface after unlocking. This avoids a problem that private information of a user is directly presented on a screen after the unlocking, thereby more comprehensively protecting the private information of the user.

Embodiment 4 of the present disclosure provides another method for protecting privacy, including, when detecting a special lock screen operation, returning, by a terminal device, to a system interface or opening a preset interface, where the special lock screen operation includes consecutively or simultaneously pressing at least two preset buttons of the terminal device; entering, by the terminal device, a locked state; and when detecting an unlock operation, first displaying, by the terminal device, the system interface or the preset interface after unlocking.

A difference between Embodiment 4 and Embodiment 1 is the following. In Embodiment 4, the terminal device does not protect private information by first displaying the second interface when detecting the special unlock operation; instead, the terminal device protects the private information in this way, when detecting the special lock screen operation, the terminal device first returns to the system interface or opens the preset interface, and then enters the locked state. The preset interface includes a preset hidden interface or a preset application interface.

A special lock screen operation includes consecutively or simultaneously pressing at least two preset buttons of a terminal device, or a special lock screen operation is to press a same preset button of the terminal device twice consecutively. The preset button includes a physical power button, a physical volume key, a physical function key, or a virtual lock screen key. For example, when detecting that the physical power button is pressed twice consecutively, the terminal device first returns to a system interface or opens a preset interface, and then enters a locked state. Alternatively, when detecting that the physical volume key and the physical power button are consecutively pressed, the terminal device first returns to a system interface or opens a preset interface, and then enters a locked state. In this way, a first interface directly displayed by the terminal device after unlocking is the system interface or the preset interface. This avoids a problem that private information of a user is directly presented on a screen after the unlocking, thereby more comprehensively protecting the private information of the user.

An embodiment of the present disclosure further provides a terminal device configured to protect private information. A structure of the terminal device is the same as that of the terminal device shown in FIG. 7. The terminal device includes a memory configured to store a preset special lock screen operation and a preset unlock operation, where the special unlock operation includes consecutively or simultaneously pressing at least two preset buttons of the terminal device; at least one sensor configured to detect the special lock screen operation and the unlock operation; a processor configured to, when the at least one sensor detects the special lock screen operation, instruct a screen of the terminal device to return to a system interface or open a preset interface, and instruct the terminal device to enter a locked state, and when the at least one sensor detects the unlock operation, instruct the screen of the terminal device to first display the system interface or the preset interface after unlocking; and a screen configured to display the system interface or the preset interface.

An embodiment of the present disclosure further provides a terminal device configured to protect private information. A structure of the terminal device is the same as that of the terminal device shown in FIG. 8. The terminal device includes a first detection unit configured to detect a special lock screen operation, where the special unlock operation includes consecutively or simultaneously pressing at least two preset buttons of the terminal device; a first processing unit configured to, when the special lock screen operation is detected, instruct the terminal device to return to a system interface or open a preset interface, and instruct the terminal device to enter a locked state; a second detection unit configured to detect an unlock operation; a second processing unit configured to, when the unlock operation is detected, instruct the terminal device to first display the system interface or the preset interface after unlocking; and a display unit configured to display the system interface or the preset interface.

Except the foregoing difference between Embodiment 4 and Embodiment 1, meanings of other terms, extension solutions, and alternatives in Embodiment 4 are the same as those in Embodiment 1.

According to the method for protecting private information and the terminal device that are provided in this embodiment of the present disclosure, after detecting a special lock screen operation, the terminal device can first return to a system interface or first open a preset interface to hide an interface including the private information, and then lock a screen. Therefore, after detecting an unlock operation, the terminal device first displays the system interface or the preset interface. This avoids a problem that the private information of a user is directly presented on the screen after unlocking, thereby more comprehensively protecting the private information of the user.

Embodiment 5 of the present disclosure provides another method for protecting privacy, including receiving first unlock input, and triggering a first function when it is detected, by means of listening, that a first event corresponding to the first unlock input matches a first preset event, where the first function is used to unlock a terminal device, so that the terminal device first displays a first interface after unlocking; and receiving second unlock input, and triggering a second function when it is detected, by means of listening, that a second event corresponding to the second unlock input matches a second preset event, where the second function is used to unlock the terminal device, so that the terminal device first displays a second interface after unlocking; where the first interface is an interface last displayed before the terminal device locks a screen, the first interface is different from the second interface, the first unlock input is different from the second unlock input, and the first event is a subset of the second event.

In Embodiment 5, the receiving unlock input includes a sensor of the terminal device converts sampled information into a signal, and the listening to an event corresponding to the unlock input includes a processor of the terminal device detects, by means of listening, whether an event corresponding to the signal matches a preset event. That a preset password "1234" is input is used as an example. The receiving first unlock input includes receiving an interrupt signal generated when a user inputs the password "1234", and the listening to a first event corresponding to the first unlock input includes generating an array by responding to the interrupt signal. The terminal device matches the generated array and a preset array, and after matching succeeds, it is detected, by means of listening, that the first event corresponding to the first unlock input matches the first preset event to trigger the first function corresponding to the first preset event, where the first function is used to unlock the terminal device, so that the terminal device first displays the first interface after the unlocking. The receiving second unlock input includes receiving an interrupt signal generated when the user inputs the password "1234" and a long press event signal generated when the user long presses a password key, and the listening to a second event corresponding to the second unlock input includes generating an array by responding to the interrupt signal. The terminal device matches the generated array and a preset array to determine whether duration of the long press event signal reaches preset duration, and when matching succeeds and a determining result is yes, it is detected, by means of listening, that the second event corresponding to the second unlock input matches the second preset event to trigger the second function corresponding to the second preset event, where the second function is used to unlock the terminal device, so that the terminal device first displays the second interface after the unlocking.

Figure 10:
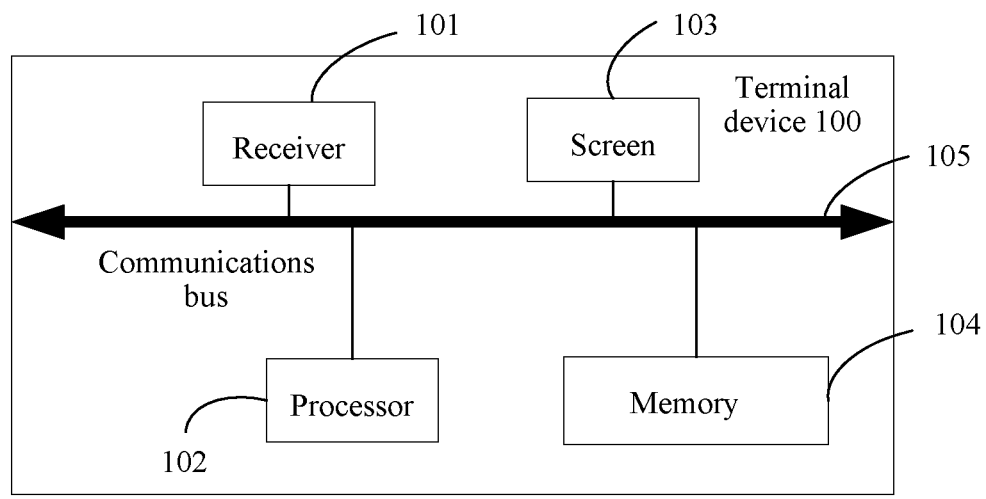
FIG. 10 is a schematic structural diagram of another terminal device configured to protect private information according to an embodiment of the present disclosure.

FIG. 10 shows a terminal device 100 configured to protect privacy according to an embodiment of the present disclosure, including a receiver 101 configured to receive first unlock input; a processor 102 configured to, when it is detected, by means of listening, that a first event corresponding to the first unlock input matches a first preset event, trigger a first function, where the first function is used to unlock the terminal device, so that the terminal device first displays a first interface after unlocking, where the receiver 101 is further configured to receive second unlock input; and the processor 102 is further configured to, when it is detected, by means of listening, that a second event corresponding to the second unlock input matches a second preset event, trigger a second function, where the second function is used to unlock the terminal device, so that the terminal device first displays a second interface after unlocking; and a screen 103 configured to display the first interface and the second interface; where the first interface is an interface last displayed before the terminal device locks a screen, the first interface is different from the second interface, the first unlock input is different from the second unlock input, and the first event is a subset of the second event.

Optionally, the terminal device 100 further includes a memory 104 that stores the first preset event, the second preset event, the first function, and the second function; and the processor 102 is further configured to match the first event and the first preset event, and match the second event and the second preset event.

Figure 11:
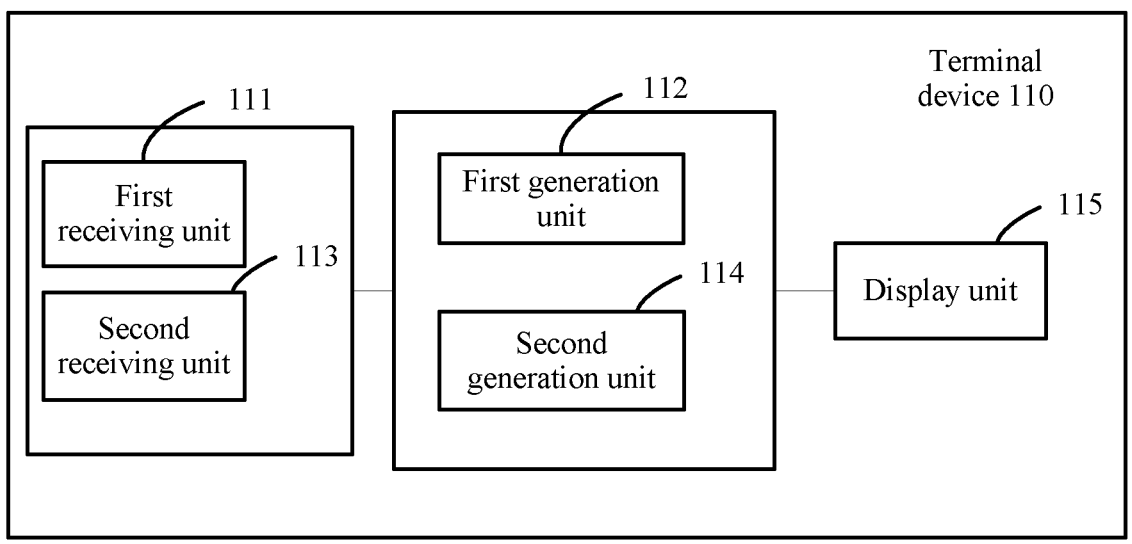
FIG. 11 is a schematic structural diagram of another terminal device configured to protect private information according to an embodiment of the present disclosure.

FIG. 11 shows a terminal device 110 configured to protect privacy according to an embodiment of the present disclosure, including a first receiving unit 111 configured to receive first unlock input; a first generation unit 112 configured to, when it is detected, by means of listening, that a first event corresponding to the first unlock input matches a first preset event, trigger a first function, where the first function is used to unlock the terminal device, so that the terminal device first displays a first interface after unlocking; a second receiving unit 113 configured to receive second unlock input; a second generation unit 114 configured to, when it is detected, by means of listening, that a second event corresponding to the second unlock input matches a second preset event, trigger a second function, where the second function is used to unlock the terminal device, so that the terminal device first displays a second interface after unlocking; and a display unit 115 configured to display the first interface and the second interface.

The first interface is an interface last displayed before the terminal device locks a screen, the first interface is different from the second interface, the first unlock input is different from the second unlock input, and the first function is a subset of the second function.

Optionally, the terminal device 110 further includes a memory unit 116 and a matching unit 117 (not shown in FIG. 11), where the memory unit 116 stores the first preset event, the second preset event, the first function, and the second function, and the matching unit 117 is configured to match the first event and the first preset event, and match the second event and the second preset event.

In this embodiment of the present disclosure, when receiving second unlock input different from first unlock input, a terminal device first displays a second interface after unlocking. This avoids a problem that private information of a user is directly presented on a screen after the unlocking, thereby more comprehensively protecting the private information of the user.

It should be understood that in all the foregoing embodiments of the present disclosure, the processor may be a central processing unit (CPU), or may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor, or the like.

The memory may include a read-only memory and a random access memory, store program code, and provide an instruction and data to the processor.

The communications bus may further include a power bus, a control bus, a status signal bus, and the like, in addition to a data bus. However, for clear description, various types of buses in the figure are marked as the communications bus.

In an implementation process, steps in the foregoing methods can be implemented by using a hardware integrated logical circuit in the processor, or by using instructions in a form of software. The steps of the method disclosed with reference to the embodiments of the present disclosure may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method of unlocking an electronic device, the method comprising:
receiving an image when a screen is in a lock mode;
determining, in response to receiving the image, whether an action of blinking or moving an eyeball is detected; and
in accordance with the determining, performing one of:
unlocking the screen of the electronic device and displaying a first interface in response to receiving the image without detecting the action of blinking or moving an eyeball, wherein the image comprises an eyeprint image or an iris image that matches a preset condition, and wherein the first interface comprises a previous interface that displayed before the screen was last locked; or
unlocking the screen and displaying a second interface in response to receiving the image and in response to detecting the action of blinking or moving an eyeball, wherein the second interface is different than the first interface.

2. The method of claim 1, wherein the image comprises the eyeprint image.

3. The method of claim 1, wherein the image comprises the iris image.

4. The method of claim 1, wherein unlocking the electronic device comprises receiving the image, and wherein detecting an action comprises detecting blinking.

5. The method of claim 1, wherein unlocking the electronic device comprises receiving the image, and wherein detecting an action comprises detecting moving the eyeball.

6. The method of claim 1, wherein unlocking the electronic device further comprises unlocking the screen in response to receiving a face image.

7. The method of claim 1, wherein the detecting an action comprises blinking while receiving the image.

8. The method of claim 1, wherein the second interface comprises a system interface.

9. The method of claim 1, wherein the second interface comprises a preset hidden interface.

10. The method of claim 1, further comprising disabling an application corresponding to the first interface before displaying the second interface.

11. The method of claim 1, further comprising:
detecting unlocking the screen and displaying the second interface a first time;
detecting locking the screen;
unlocking the screen and displaying the first interface or the second interface a second time; and
displaying an interface displayed before the screen was last locked in response to unlocking the screen and displaying the first interface or the second interface a second time.

12. The method of claim 1, wherein the second interface comprises a preset application interface.

13. A terminal device, comprising:
a memory configured to store instructions;
a sensor configured to receive an image, wherein the image comprises an eyeprint image or an iris image of a user;
a screen; and
a processor coupled to the memory, the sensor, and the screen and configured to execute the instructions to:
receive an image when a screen is in a lock mode;
determine, in response to receiving the image, whether an action of blinking or moving an eyeball is detected; and
in accordance with the determining, perform one of:
unlock the screen and display a first interface in response to receiving, from the sensor, the image without detecting the action of blinking or moving an eyeball, wherein the image comprises an eyeprint image or an iris image that matches a preset condition, and wherein the first interface comprises a previous interface displayed before the screen was last locked; or
unlock the screen and display a second interface in response to receiving the image and in response to detecting the action of blinking or moving an eyeball, wherein the second interface is different than the first interface.

14. The terminal device of claim 13, wherein the image comprises the eyeprint image.

15. The terminal device of claim 13, wherein the image comprises the iris image.

16. The terminal device of claim 13, wherein unlocking the screen comprises receiving the eyeprint image, and wherein detecting an action comprises detecting blinking.

17. The terminal device of claim 13, wherein unlocking the screen comprises receiving the iris image, and wherein detecting an action comprises detecting moving the eyeball.

18. The terminal device of claim 13, wherein unlocking the screen further comprises unlocking the screen in response to receiving, by the sensor, a face image.

19. The terminal device of claim 13, further comprising disabling an application corresponding to the first interface before displaying the second interface.

20. A computer program product comprising computer-executable instructions stored on a non-transitory computer-readable medium that, when executed by a processor, cause an apparatus to:
receive an image when a screen is in a lock mode;
determine, in response to receiving the image, whether an action of blinking or moving an eyeball is detected; and
in accordance with the determining, perform one of:
unlock the screen and display a first interface in response to receiving the image, wherein the image comprises an eyeprint image or an iris image that matches a preset condition, and wherein the first interface comprises a previous interface displayed before the screen was last locked; or
unlock the screen and display a second interface in response to receiving the image and in response to detecting the action of blinking or moving an eyeball, wherein the second interface is different than the first interface.

* * * * *